(12) United States Patent
Alley

(10) Patent No.: US 10,338,548 B2
(45) Date of Patent: Jul. 2, 2019

(54) LOGIC BASED SIMPLEX/DUAL/TMR DRIVER FOR CONTROL OUTPUTS

(71) Applicant: General Electric Company, Schenectady, NY (US)

(72) Inventor: Daniel Milton Alley, Salem, VA (US)

(73) Assignee: General Electric Company, Schenectady, NY (US)

( * ) Notice: Subject to any disclaimer, the term of this patent is extended or adjusted under 35 U.S.C. 154(b) by 67 days.

(21) Appl. No.: 15/489,107

(22) Filed: Apr. 17, 2017

(65) Prior Publication Data

US 2018/0299848 A1    Oct. 18, 2018

(51) Int. Cl.
| G05B 15/02 | (2006.01) |
| H04B 7/26 | (2006.01) |
| G05B 9/03 | (2006.01) |
| G05B 19/418 | (2006.01) |

(52) U.S. Cl.
CPC .............. *G05B 15/02* (2013.01); *G05B 9/03* (2013.01); *G05B 19/4184* (2013.01); *H04B 7/2643* (2013.01); *G05B 2219/14016* (2013.01); *Y02P 90/14* (2015.11); *Y02P 90/18* (2015.11)

(58) Field of Classification Search
CPC .............................. G05B 15/02; H04B 7/2643
See application file for complete search history.

(56) References Cited

U.S. PATENT DOCUMENTS

| 5,285,381 A | 2/1994 | Iskarous et al. |
| 5,493,519 A | 2/1996 | Allen, III |
| 5,508,910 A | 4/1996 | Diehl |
| 6,449,732 B1 | 9/2002 | Rasmussen et al. |
| 7,793,005 B1* | 9/2010 | Fernald ............... H02M 3/1584 323/222 |
| 8,400,795 B2* | 3/2013 | Blackwell ................. H02J 1/10 363/65 |
| 8,656,065 B1 | 2/2014 | Gerhart et al. |
| 9,116,531 B2 | 8/2015 | Alley |
| 2003/0069649 A1 | 4/2003 | Tahira |
| 2007/0094524 A1* | 4/2007 | Kris ........................ H02J 1/102 713/300 |

(Continued)

FOREIGN PATENT DOCUMENTS

| EP | 0546855 A1 | 6/1993 |
| WO | 2015174979 A1 | 11/2015 |

OTHER PUBLICATIONS

Ravikumar, Nivethithaa et al., "An Area Efficient 10-bit Time Mode Hybrid DAC With Current Settling Error Compensation", 2015 IEEE 58th International Midwest Symposium on Circuits and Systems, Fort Collins, CO, Aug. 2-5, 2015, pp. 1-4.

(Continued)

*Primary Examiner* — Vincent H Tran
(74) *Attorney, Agent, or Firm* — Armstrong Teasdale LLP

(57) ABSTRACT

The exemplified methods and systems support shared output drivers or shared control setting drivers across separate control devices for a redundant system of 1, 2, 3, or more control devices in simplex, dual, triple redundancy, and etc. Digital communication links between the control devices are implemented to facilitate sensing, from other control devices, of operation states (e.g., amount of contribution by the control devices to the shared output) and on-line/health status of other control devices in the redundant network.

20 Claims, 10 Drawing Sheets

(56) References Cited

U.S. PATENT DOCUMENTS

| | | | | |
|---|---|---|---|---|
| 2009/0230772 A1* | 9/2009 | Caudill | ................... | H02J 3/46 |
| | | | | 307/44 |
| 2011/0066871 A1* | 3/2011 | Farmer | ................... | G06F 1/263 |
| | | | | 713/340 |
| 2012/0029722 A1* | 2/2012 | Lee | ................... | H02J 1/102 |
| | | | | 700/297 |
| 2013/0238151 A1* | 9/2013 | Vaum | ................... | G05B 15/00 |
| | | | | 700/286 |
| 2014/0229755 A1* | 8/2014 | Kris | ................... | H02J 1/102 |
| | | | | 713/340 |
| 2014/0239923 A1 | 8/2014 | Alley | | |
| 2016/0011650 A1* | 1/2016 | Yang | ................... | G06F 1/263 |
| | | | | 713/323 |
| 2016/0116957 A1* | 4/2016 | Chen | ................... | G06F 1/263 |
| | | | | 713/340 |

OTHER PUBLICATIONS

Zou, Jian-xiao et al., "Design and Reliability Analysis of Emergency Trip System with Triple Modular Redundancy", 2009 International Conference on Communications, Circuits and Systems, Milpitas, CA, Jul. 23-25, pp. 1006-1009.

Extended European Search Report and Opinion issued in connection with corresponding EP Application No. 18166531.6 dated Sep. 6, 2018.

* cited by examiner

| State | Own Active | Own state_msb | Own state_lsb | Other_1 msb | Other_1 lsb | Other_2 msb | Other_2 lsb | DAC Output | Status Out = New Device State | Net current Out Prior to Chg. |
|---|---|---|---|---|---|---|---|---|---|---|
| 1 | 0 | X | X | X | X | X | X | Disabled | 00 = inactive | n/a |
| 2 | 1 | 0 | 0 | X | X | X | X | Disabled | 00 = inactive | 216 n/a |
| 3 | 1 | 0 | 1 | 0 | 0 | 0 | 0 | Output at 100% | 11=100% | 214 33% |
| 4 | 1 | 0 | 1 | 0 | 0 | 0 | 1 | Shift to 50% | 10 = 50% | 67% |
| 5 | 1 | 0 | 1 | 0 | 0 | 1 | 0 | Shift to 50% | 10 = 50% | 133% |
| 6 | 1 | 0 | 1 | 0 | 1 | 0 | 0 | Shift to 50% | 10 = 50% | 212 67% |
| 7 | 1 | 0 | 1 | 0 | 1 | 1 | 0 | Output at 33% | 01 = 33% | 100% |
| 8 | 1 | 0 | 1 | 1 | 1 | 0 | X | Output at 33% | 01 = 33% | 167% |
| 9 | 1 | 0 | 1 | 1 | 1 | 0 | 1 | Output at 33% | 01 = 33% | 117% |
| 10 | 1 | 0 | 1 | 1 | 0 | 1 | 0 | Output at 33% | 01 = 33% | 133% |
| 11 | 1 | 0 | 1 | 1 | 0 | 0 | 1 | Shift to 33% | 01 = 33% | 183% |
| 12 | 1 | 0 | 1 | 1 | 0 | 0 | 0 | Output at 33% | 01 = 33% | 133% |
| 13 | 1 | 0 | 1 | 1 | 1 | 0 | 1 | Output at 33% | 01 = 33% | 167% |
| 14 | 1 | 0 | 1 | 1 | 1 | 1 | x | Shift to 33% | 01 = 33% | 233% |
| 15 | 1 | 1 | 0 | 0 | 0 | 0 | 0 | Output at 100% | 11=100% | 50% |
| 16 | 1 | 1 | 0 | 0 | 0 | 0 | 1 | Shift to 50% | 10 = 50% | 83% |
| 17 | 1 | 1 | 0 | 0 | 0 | 1 | 0 | Output at 50% | 10 = 50% | 100% |
| 18 | 1 | 1 | 0 | 0 | 0 | 1 | 1 | Output at 50% | 10 = 50% | 150% |

*FIG. 2*

| State | Own Active | Own state_msb | Own state_lsb | Other_1 msb | Other_1 lsb | Other_2 msb | Other_2 lsb | DAC Output | Status Out = New Device State | Net current Out Prior to Chg. |
|---|---|---|---|---|---|---|---|---|---|---|
| 19 | 1 | 1 | 0 | 0 | 1 | 0 | 0 | Output at 50% | 10 = 50% | 83% |
| 20 | 1 | 1 | 0 | 0 | 1 | 0 | 1 | Shift to 33% | 01 = 33% | 117% |
| 21 | 1 | 1 | 0 | 0 | 1 | 1 | x | Shift to 33% | 01 = 33% | 183% |
| 22 | 1 | 1 | 0 | 1 | 0 | 0 | 0 | Output at 50% | 10 = 50% | 100% |
| 23 | 1 | 1 | 0 | 1 | 0 | 0 | 1 | Shift to 33% | 01 = 33% | 133% |
| 24 | 1 | 1 | 0 | 1 | 0 | 1 | 0 | Shift to 33% | 01 = 33% | 150% |
| 25 | 1 | 1 | 0 | 1 | 0 | 1 | 1 | Shift to 33% | 01 = 33% | 200% |
| 26 | 1 | 1 | 0 | 1 | 1 | 0 | 0 | Output at 50% | 10 = 50% | 150% |
| 27 | 1 | 1 | 0 | 1 | 1 | 0 | 1 | Shift to 33% | 01 = 33% | 183% |
| 28 | 1 | 1 | 0 | 1 | 1 | 1 | 0 | Shift to 33% | 01 = 33% | 200% |
| 29 | 1 | 1 | 0 | 1 | 1 | 1 | 1 | Shift to 33% | 01 = 33% | 250% |
| 30 | 1 | 1 | 1 | 0 | 0 | 0 | 0 | Output at 100% | 11 = 100% | 100% |
| 31 | 1 | 1 | 1 | 0 | 0 | 1 | x | Shift to 50% | 10 = 50% | 200% |
| 32 | 1 | 1 | 1 | 0 | 1 | 1 | 1 | Shift to 33% | 01 = 33% | 167% |
| 33 | 1 | 1 | 1 | 0 | 1 | 1 | x | Shift to 33% | 01 = 33% | 233% |
| 34 | 1 | 1 | 1 | 1 | x | 0 | 0 | Shift to 50% | 10 = 50% | 200% |
| 35 | 1 | 1 | 1 | 1 | x | 0 | 1 | Shift to 33% | 01 = 33% | 233% |
| 36 | 1 | 1 | 1 | 1 | x | 1 | x | Shift to 33% | 01 = 33% | 300% |

*FIG. 2 (CONT.)*

| State | Notes |
|---|---|
| 1 | Stay inactive |
| 2 | Go inactive, shutting off |
| 3 | Former TMR with two other devices going off-line at same time |
| 4 | Former TMR with other_1 going off-line at same time |
| 5 | Shift to dual mode since two on line |
| 6 | Former TMR with other_2 going off-line at same time |
| 7 | Correct TMR operation |
| 8 | Slow change to TMR - two of three believe they are in TMR, remain at 33% to correct other on next scan |
| 9 | TMR where 2 of 3 at 33%, one other believes it is at 50%, remain at 33% |
| 10 | Former dual where others will need to shift to 33% on next scan |
| 11 | Three on line, shift to TMR |
| 12 | Jump from Simplex to TMR allowing for slow other device |
| 13 | Jump from simplex to TMR in one scan |
| 14 | Three on line, shift to TMR |
| 15 | Was dual going to simplex mode |
| 16 | Confusion - one dual, one TMR, stay in dual mode with other fixed next scan |
| 17 | Normal dual mode |
| 18 | Going to dual mode operation |
| 19 | Confusion - other unit off and TMR, stay at 50% and let other unit shift to dual mode on next scan |
| 20 | Own device needs to set to TMR to match others in system |
| 21 | Going from dual to TMR operation |
| 22 | Normal dual mode |
| 23 | New unit coming on line for TMR, shift to TMR scaling |
| 24 | All three in dual mode, shift to TMR |
| 25 | Three on line, shift to TMR |
| 26 | Two on line, stay in dual |
| 27 | Three on line, shift to TMR |
| 28 | Three on line, shift to TMR |
| 29 | Three on line, shift to TMR |
| 30 | Single device running at 100% |
| 31 | New device coming on-line with dual redundancy |
| 32 | Two new devices coming on-line with triple redundancy |
| 33 | Two new devices coming on-line with triple redundancy |
| 34 | New device coming on-line with dual redundancy |
| 35 | Two new devices coming on-line with triple redundancy |
| 36 | Two new devices coming on-line with triple redundancy |

*FIG. 3*

500 

Communicate, at each controllable cycle, over one or more links (e.g., a bus), for a given controllable device of the plurality of controllable devices, a binary-framed pattern of a set of pre-defined binary-framed patterns (e.g., a time-division pulse that corresponds to two or more bits or a bit pattern having two or more bits) to each of one or more other devices of the plurality of controllable devices, wherein each pre-defined binary-framed pattern corresponds to one of a pre-defined output state (e.g., state machine having states associated with a DAC output value for a DAC driver or current limit for solid state output driver), of a set of pre-defined output states (e.g., 100% for simplex operation 50% for dual redundant operation; and 33% for triple modular redundant operation, etc.), of the controllable device
502

Upon receiving, at the given controllable device, during a current controllable cycle, over the one or more links, a binary-framed pattern from each of the one or more other devices (e.g., two or more) of the plurality of controllable devices, generate, at an output of the given controllable device, for the current controllable cycle, an output value (e.g., DAC output value or current limit value) corresponding to one of the set of pre-defined output states based on logic states determined according to a first pre-defined output state associated with the transmitted binary-framed pattern and a second one or more pre-defined output states associated with the received binary-framed pattern
504

*FIG. 5*

| Own state_msb | Own state_lsb | Other_1 msb | Other_1 lsb | Other_2 msb | Other_2 lsb | DAC Output |
| --- | --- | --- | --- | --- | --- | --- |
| X | X | X | X | X | X | Disabled |
| 0 | 0 | X | X | X | X | Disabled |
| 0 | 1 | 0 | 0 | 0 | 0 | Output at 100% |
| 1 | 0 | 0 | 0 | 0 | 0 | Output at 100% |
| 1 | 1 | 0 | 0 | 0 | 0 | Output at 100% |

*FIG. 6A*

| Own state_msb | Own state_lsb | Other_1 msb | Other_1 lsb | Other_2 msb | Other_2 lsb | DAC Output |
| --- | --- | --- | --- | --- | --- | --- |
| 0 | 1 | 0 | 0 | 0 | 1 | Shift to 50% |
| 0 | 1 | 0 | 1 | 0 | 0 | Shift to 50% |
| 0 | 1 | 0 | 0 | 1 | X | Shift to 50% |
| 1 | 1 | 1 | 0 | 1 | X | Shift to 50% |
| 1 | 0 | 0 | 1 | 0 | 0 | Shift to 50% |
| 1 | 0 | 0 | 0 | 0 | 1 | Output at 50% |
| 1 | 0 | 0 | 0 | 1 | 1 | Shift to 50% |
| 1 | 0 | 0 | 0 | 0 | 0 | Output at 50% |
| 1 | 0 | 1 | 0 | 0 | 0 | Output at 50% |
| 1 | 0 | 1 | 1 | 0 | 0 | Output at 50% |

*FIG. 6B*

| Own state_msb | Own state_lsb | Other_1 msb | Other_1 lsb | Other_2 msb | Other_2 lsb | |
|---|---|---|---|---|---|---|
| 1 | 0 | 1 | 0 | 1 | 0 | Shift to 33% |
| 1 | 0 | 0 | 1 | 1 | x | Shift to 33% |
| 1 | 0 | 1 | 0 | 0 | 1 | Shift to 33% |
| 1 | 0 | 0 | 1 | 1 | 1 | Shift to 33% |
| 0 | 1 | 1 | 0 | 1 | 1 | Shift to 33% |
| 0 | 1 | 1 | 1 | 1 | x | Shift to 33% |
| 1 | 0 | 1 | 0 | 0 | 1 | Shift to 33% |
| 1 | 0 | 1 | 1 | 1 | 1 | Shift to 33% |
| 1 | 0 | 1 | 1 | 0 | 0 | Shift to 33% |
| 1 | 1 | 0 | 1 | 1 | 1 | Shift to 33% |
| 1 | 1 | 0 | 1 | 0 | x | Shift to 33% |
| 1 | 1 | 1 | x | 1 | 1 | Shift to 33% |
| 1 | 1 | 1 | x | 0 | x | Shift to 33% |
| 0 | 1 | 0 | 1 | 1 | 1 | Output at 33% |
| 0 | 1 | 1 | 0 | 0 | 0 | Output at 33% |
| 0 | 1 | 1 | 1 | 0 | 0 | Output at 33% |
| 0 | 1 | 1 | 1 | 1 | 1 | Output at 33% |
| 0 | 1 | 0 | 0 | 1 | x | Output at 33% |
| 0 | 1 | 1 | 0 | 0 | 1 | Output at 33% |

*FIG. 6C*

LOGIC BASED SIMPLEX/DUAL/TMR DRIVER FOR CONTROL OUTPUTS

TECHNICAL FIELD

The disclosure generally relates to control systems in automation controls.

BACKGROUND

In gas turbine plants, co-generation plants, combined cycle plants, manufacturing facilities, among others, redundant control operations (e.g., dual, triple, etc.) may be required for monitoring or controlling critical processes. In gas turbine systems, for example, control of fuel line controllers and sensors often include dual or triple redundancy operations.

A class of redundant control system includes three identical modular sub-systems that each receives a same input and provide a same output. A voting circuit selects an output from among the three outputs of the sub-system. Another class of redundant control system uses high-speed analog or mixed signal feedbacks to regulate the controls of the three sub-system. These additional circuitries add cost and complexity to the redundant control system.

What are needed are devices, systems, and methods that can address such limitations, among others.

SUMMARY

The exemplified methods and systems use shared outputs or shared control settings across separate control devices, operating in concert, to provide a redundant system of 1, 2, 3, or more control devices in simplex, dual, triple redundancy, and etc. Digital communication links between the control devices (also referred to herein as "controllable devices") are implemented to facilitate sensing, from other control devices, of operation states (e.g., an encoded pattern that represents a contributed amount to the shared outputs or shared control settings by the control devices). In some embodiments, each control device is configured to adjust between a contribution of 33 percent (%), 50 percent (%), and 100 percent (%) to the shared set point (e.g., current output or current limit) to provide the overall accumulated output (e.g., current output or current limit) of the control system. The exemplified methods and systems, in some embodiments, reduce complexity of redundant operations via use of logic circuitries (and not including analog and mixed signal components) in the controls and observations of state information of each controllable device. Slew rate limiting may be used in combination with such circuits, e.g., to reduce current disturbances when other devices in the redundant system come on-line.

In some embodiments, the exemplified methods and systems facilitate fault checking that allow devices to come on-line (and off-line) while other devices are operational. To this end, the control devices can operate in simplex or dual redundant modes and then automatically shift to dual or triple redundant mode when additional control devices come on-line.

Among other applications, the exemplified methods and systems may be implemented in balance of plant applications, distributed control, and generalized control applications in which redundant control operation is desired.

In an aspect, a method is disclosed of operating a plurality of controllable devices, collectively, forming a redundant control system (e.g., dual or triple redundant control system). The method includes, transmitting, at each controllable cycle over one or more links (e.g., a bus) for a given controllable device of the plurality of controllable devices, a binary-framed pattern of a set of pre-defined binary-framed patterns (e.g., a time-division pulse that corresponds to two or more bits or a bit pattern having two or more bits) to each of one or more other devices of the plurality of controllable devices, wherein each pre-defined binary-framed pattern corresponds to one of a pre-defined output state (e.g., state machine having states associated with a DAC (digital-analog converter) output value for a DAC driver or current limit for solid state output driver) of a set of pre-defined output states (e.g., 100% for simplex operation 50% for dual redundant operation; and 33% for triple modular redundant operation, etc.) of the controllable device; and, upon receiving, at the given controllable device during a current controllable cycle over the one or more links, a binary-framed pattern from each of the one or more other devices (e.g., two or more) of the plurality of controllable devices, generating, at an output of the given controllable device for the current controllable cycle, an output value (e.g., DAC output value or current limit value) corresponding to one of the set of pre-defined output states based on logic states determined according to a first pre-defined output state associated with the transmitted binary-framed pattern and a second one or more pre-defined output states associated with the received binary-framed pattern.

In some embodiments, the method includes, updating (e.g., for each of the controllable device) the first pre-defined output state, for a next immediate controllable cycle, based on logic states determined (e.g. solely determined) according to the first pre-defined output state associated with the current controllable cycle and the second one or more pre-defined output states associated with the current controllable cycle.

In some embodiments, the logic states are used to determine the output value based on a number of active binary-framed pattern among the first pre-defined output state and the second one or more pre-defined output states.

In some embodiments, the given controllable device is communicatively coupled, via the one or more links, to each of the one or more other devices, wherein the one or more links comprises a first time division multiplexed channel for transmitting the binary-framed pattern to each of the one or more other devices and a second time division multiplexed channel for receiving the binary-framed pattern from each of the one or more other devices.

In some embodiments, the set of pre-defined output states comprises four output states, including a first output state associated with zero output, a second output states associated with 33-percent shared output (e.g., for TMR (triple modular redundancy) operation), a third output state associated with 50-percent shared output (e.g., for dual redundant operation), and a fourth output state associated with no shared output (e.g., for simplex operation).

In some embodiments, the output value is generated by scaling a control setpoint for the output value with a pre-defined scale value associated with a logic state determined according to the first pre-defined output state and the second one or more pre-defined output states.

In some embodiments, the given controllable device comprises an output circuit selected from the group consisting of a DAC (digital-to-analog converter) driver configured for 4-20 mA output, a DAC driver configured for 0-200 mA, and a solid state driver with current limit.

In some embodiments, the transmitted binary-framed pattern comprises a number of bits selected from the group consisting of 2, 3, 4, 5, 6, 7, and 8.

In another aspect, an apparatus is disclosed that collectively forms a redundant control system (e.g., dual or triple redundant control system) with one or more other apparatuses. The apparatus includes, a logic-based circuit configured to, upon receiving during a current controllable cycle over one or more links, a binary-framed pattern from each of one or more other apparatuses (e.g., two or more), generate, at an output for the current controllable cycle, an output value (e.g., DAC output value or current limit value) corresponding to one of a set of pre-defined output states based on logic states determined according to a first pre-defined output state associated with the transmitted binary-framed pattern and a second one or more pre-defined output states associated with the received binary-framed pattern, wherein each apparatus, and one or more other apparatuses collectively forming the redundant control system, is configured to transmit, over the one or more links (e.g., a bus), a binary-framed pattern of the set of pre-defined binary-framed patterns (e.g., a time-division pulse that corresponds to two or more bits or a bit pattern having two or more bits) to each of one or more other apparatuses, wherein each pre-defined binary-framed pattern corresponds to one of a pre-defined output state (e.g., state machine having states associated with a DAC output value for a DAC driver or current limit for solid state output driver) of the set of pre-defined output states (e.g., 100% for simplex operation 50% for dual redundant operation; and 33% for triple modular redundant operation, etc.).

In some embodiments, the logic-based circuit is configured to update (e.g., for each of the controllable device) the first pre-defined output state, for a next immediate controllable cycle, based on logic states determined (e.g. solely determined) according to the first pre-defined output state associated with the current controllable cycle and the second one or more pre-defined output states associated with the current controllable cycle.

In some embodiments, the logic-based circuit is configured to determine the output value based on a number of active binary-framed pattern among the first pre-defined output state and the second one or more pre-defined output states.

In some embodiments, the apparatus is communicatively coupled via the one or more links to each of the one or more other apparatuses, wherein the one or more links comprises a first time division multiplexed channel for transmitting the binary-framed pattern to each of the one or more other apparatuses and a second time division multiplexed channel for receiving the binary-framed pattern from each of the one or more other apparatuses.

In some embodiments, the set of pre-defined output states comprises four output states, including a first output state associated with zero output, a second output states associated with 33-percent shared output (e.g., for TMR (triple modular redundancy) operation), a third output state associated with 50-percent shared output (e.g., for dual redundant operation), and a fourth output state associated with no shared output (e.g., for simplex operation).

In some embodiments, the apparatus includes, a multiplexer circuit to select one of multiple scaled control setpoint provided as input thereto, the multiplexer circuit being configured to select the input based on a logic state value determined according to the first pre-defined output state and the second one or more pre-defined output states.

In some embodiments, the apparatus includes an output circuit selected from the group consisting of a DAC (digital-to-analog converter) driver configured for 4-20 mA output, a DAC driver configured for 0-200 mA, and a solid state driver with current limit.

In some embodiments, the transmitted binary-framed pattern comprises a number of bits selected from the group consisting of 2, 3, 4, 5, 6, 7, and 8.

In some embodiments, the logic-based circuit is selected from the group consisting of a 6-bit decoder, a 9-bit decoder, and a 16-bit decoder.

In another aspect, a redundant control system is disclosed. The system includes a plurality of controllable devices, wherein each of the controllable devices includes a logic-based circuit configured to, upon receiving, during a current controllable cycle over one or more links, a binary-framed pattern from each of one or more other controllable devices (e.g., two or more), generate, at an output for the current controllable cycle, an output value (e.g., DAC output value or current limit value) corresponding to one of a set of pre-defined output states based on logic states determined according to a first pre-defined output state associated with the transmitted binary-framed pattern and a second one or more pre-defined output states associated with the received binary-framed pattern, wherein each controllable device of the plurality of controllable devices, collectively forming the redundant control system, is configured to transmit, over the one or more links (e.g., a bus), a binary-framed pattern of a set of pre-defined binary-framed patterns (e.g., a time-division pulse that corresponds to two or more bits or a bit pattern having two or more bits) to each of one or more other controllable devices, wherein each pre-defined binary-framed pattern corresponds to one of a pre-defined output state (e.g., state machine having states associated with a DAC output value for a DAC driver or current limit for solid state output driver), of the set of pre-defined output states (e.g., 100% for simplex operation 50% for dual redundant operation; and 33% for triple modular redundant operation, etc.).

In some embodiments, each of the controllable devices comprises an output circuit selected from the group consisting of a DAC (digital-to-analog converter) driver configured for 4-20 mA output, a DAC driver configured for 0-200 mA, and a solid state driver with current limit.

In some embodiments, the plurality of controllable devices comprises a first controllable device, a second controllable device, and a third controllable device.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 2 and 3 show example states of the controllable device as stored in the logic block, in accordance with an illustrative embodiment.

FIG. 5 is a diagram of a method of operating a plurality of controllable devices, collectively, forming the redundant control system, in accordance with an illustrative embodiment.

FIGS. 6A, 6B, and 6C show the Karnaugh map of FIG. 2 organized according to different state output, in accordance with an illustrative embodiment.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

Example Redundant Control System and Controllable Devices Therein

Figure 1:
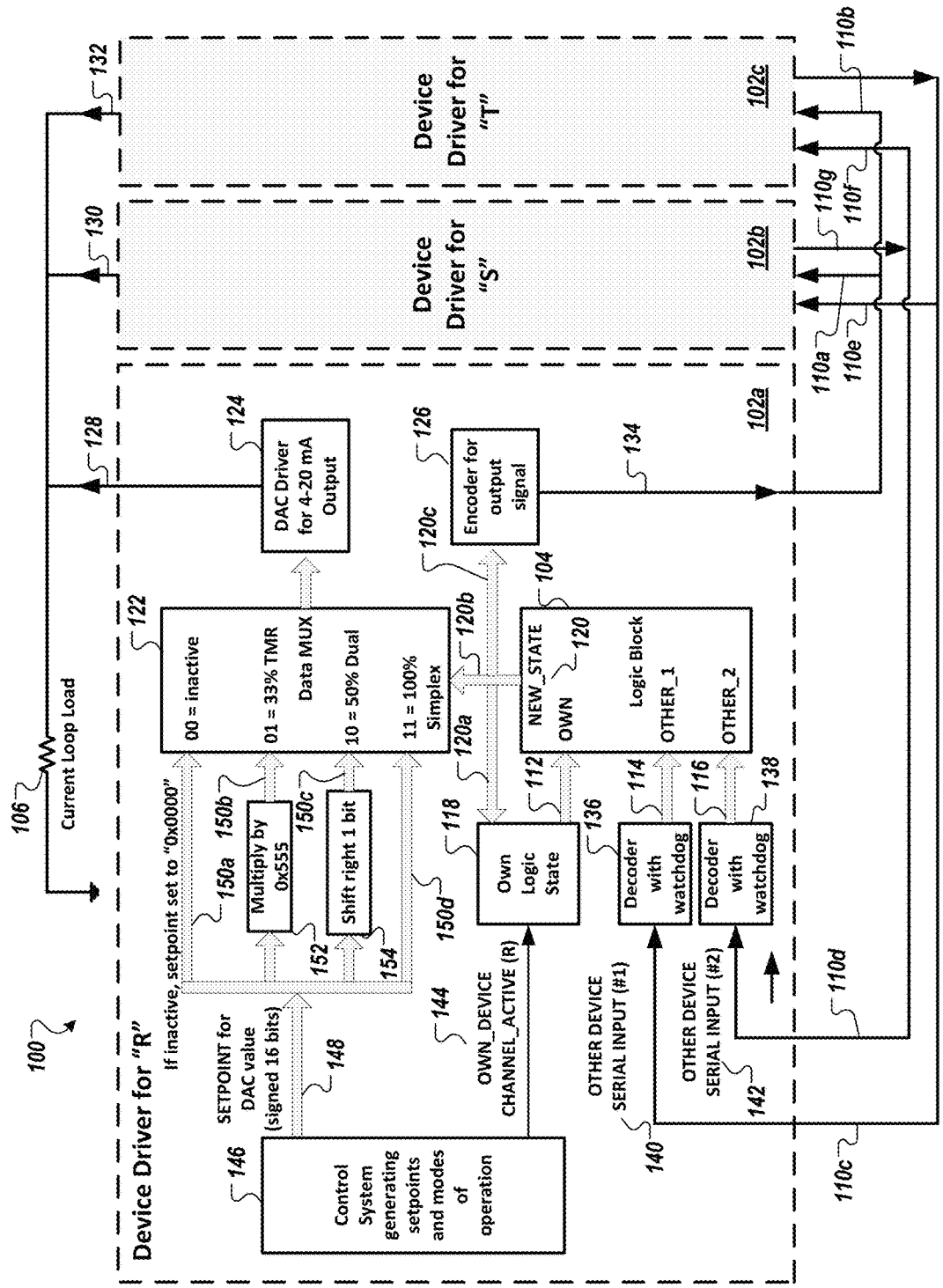
FIG. 1 illustrates example controllable devices, collectively, forming a redundant control system (e.g., dual or triple redundant control system), in accordance with an illustrative embodiment.

FIG. 1 illustrates example controllable devices 102 (shown as "Device Driver for R'" 102a, "Device Driver for 'S'" 102b, and "Device Driver for 'T'" 102c), collectively, forming a redundant control system 100 (e.g., dual or triple redundant control system), in accordance with an illustrative embodiment.

As shown in FIG. 1, each redundant control system 100 is configured to include one, two, three, or more, controllable devices 102, as a device channel" in the system 100, interconnected in redundancy in which each controllable device 102 is configured to sense, using serial data, state information of the other two device channels.

Referring still to FIG. 1, the controllable device 102 includes a logic block 104 configured to adjust the output current driven via a driver 124 (e.g., to provide a shared DAC (digital-to-analog converter) output or a shared electrical-current limit setting) to a shared output load 108 (shown as "Current Loop Load" 108). The controllable device 102 communicates via logic signals, over a digital communication link 110 (shown as 110a-g), to indicate its respective current settings (e.g., for a current controllable cycle) or future settings (e.g., for a next controllable cycle).

Though shown with three controllable devices, the redundant control system 100 may be configured with more than three devices (e.g., 4 devices, 5 devices, or more).

The exemplified methods and systems, in some embodiments, reduce complexity of redundant operations (without use of analog and mixed signal components) via use of logic circuitries in the controls and observations of state information of each controllable device 102a-102c. In addition, the exemplified methods and systems facilitate the redundant sharing of output states (e.g., rather than a majority output being selected via a voting circuitry) in which each controllable device actively contributes to the overall control output of the system comprising the multiple controllable devices.

The logic circuitries may be implemented in field-programmable gate arrays (FPGAs), complex programmable logic devices (CPLDs), application-specific integrated circuits (ASICs), and other mainly, or purely, digital circuitries. These digital components generally are lower in cost, using fewer parts, as compared to their analog and mix-signal counterparts used in conventional TMR systems.

Referring still to FIG. 1, the controllable device 102a is configured to transmit, via links (110a, 110b), in a binary-framed pattern, state data (e.g., for the current controllable cycle or next controllable cycle) associated with the controllable device 102a to each of the corresponding logic circuits in other controllable devices (e.g., 102b and 102c) and to receive, via the links (110c, 110d), a binary-framed pattern comprising state data associated with the other controllable devices (e.g., 102b and 102c). The state date associated with each of the other controllable devices (e.g., 102b and 102c) are also shared among each other via the link 110 (shown as 110e-110h). As shown, controllable device 102b transmits its state data to controllable device 102a over link 110d and to controllable device 102c over link 110f; and controllable device 102c transmits its state data to controllable device 102a over link 110c and to controllable device 102b over link 110e.

In some embodiments, each controllable device (e.g., 102a, 102b, 102c) includes a device driver that is part of a separate board assembly mountable to a common carrier of terminal board to provide the communication links between up to three or more devices. In some embodiments, each of the separate board assembly provides a shared output node that generates an electric current flow to an electric-current loop load.

Each controllable device 102a-102c is configured, in some embodiments, to operate in one of four states (e.g., also referred to herein as pre-defined output states) (e.g., electric-current output or electric-current settings): inactive (or active in output mode), 100% driven (Simplex), 50% driven (Dual Redundant or TMR with one section inactive), or 33% driven (TMR with all active). In some embodiments, the states are transmitted in binary-framed pattern which includes a first output state associated with zero output, a second output states associated with 33-percent shared output (e.g., for TMR (triple modular redundancy) operation), a third output state associated with 50-percent shared output (e.g., for dual redundant operation), and a fourth output state associated with no shared output (e.g., for simplex operation). The states, in some embodiments, are determined, in the logic block 104, based on the internal state of the controllable device (e.g., 102a) and the communicated states received from the other controllable devices (e.g., 102b and 102c) to which the logic block 104 and corresponding circuits of each respective controllable device 102 are configured to adjust the set-point for the device's state output (e.g., electrical-current output or current limit setting). In some embodiments, logic block 104 includes a 6-bit decoder. In other embodiments, the logic-based circuit is a 9-bit decoder. In other embodiments, the logic-based circuit and a 16-bit decoder.

FIGS. 2 and 3 show example states of the controllable device (e.g. 102a, 102b, and 102c) as stored in the logic block 104, in accordance with an illustrative embodiment. Further discussion of FIGS. 2 and 3 provided later below.

As state above, the redundant control system may be configured with more than three devices (e.g., 4 devices, 5 devices, or more). For a four-device system, each controllable device 102 may have 5 states (e.g., inactive; 25%, 50%, 75% and 100%). For a five-device system, each controllable device 102 may have 6 states (e.g., inactive, 20%, 40%, 60%, 80%, and 100%). Other system configuration with more than 5 devices can be implemented in a similar manner.

As shown in FIG. 1, the logic block 104 includes a first binary frame input 112 for own logic state from circuit 118, a second binary frame input 114 for the operational state of a first other device (e.g., 102b), and a third binary frame input 116 for the operational state of a second other device (e.g., 102c). The output 120 of the logic block 104, e.g., as an output binary frame, is feedback (e.g., 120a) to update its own logic state (e.g., in circuit 118) and also to drive (e.g., 120b) an output portion of the circuit, shown in FIG. 1, comprising a data multiplexer 122 (shown as "Data MUX" 122) and a state output driver 124 (shown as 'DAC Driver for 4-20 mA Output" 124). Each of the binary frame inputs and output binary frame, may be serialized or parallelized. In some embodiments, the logic state (e.g., in circuit 118) is implemented in a buffer, queue, or cache. The updated logic provides a new first binary frame input (e.g., 112), for a next immediate controllable cycle to be combined with a next second binary frame input (e.g., 114) and a next third binary frame input (e.g., 116).

In FIG. 1, the state output driver 124 is configured to output an electric current 128 to the current loop load 106. Corresponding output electric current (130, 132) of the other controllable devices (e.g., 102b and 102c) are combined to drive the current loop load 106. In some embodiments, the state output driver 124 is configured to output a 4-20 mA current output, a 0-200 mA current output, or other current or voltage ranges. In some embodiments, the outputs are used as a feedback signal for a sensor to which the system 100 is provided redundant operation. In some embodiments, the outputs are used as a signal to limit an adjustable current limit setting for a solid state relay (SSR) device. In some embodiments, the outputs are used as a control signal to drive an actuatable control component (e.g., a plant component such a pump, a valve, and etc.)

Referring still to FIG. 1, the output 120 of the logic block 104 is provided (e.g., 120c) to an encoder 126 that generates, from the output binary frame, an output signal 134 that is encoded as a serialized binary-framed pattern as feedback (e.g., via links 110a and 110b) of the operation state of the controllable device 102a to the other controllable devices (e.g., 102b and 102c).

In some embodiments, the links 110a-1110h are synchronous serial communication interface such as serial peripheral interface (SPI) bus and Inter Integrated Circuit Communications (I2C). In other embodiments, the links 110a-110h are synchronous parallel communication. Other types of digital communication may be used without departing from the spirit of the disclosure. In some embodiments, each link comprises a time division multiplexed channel for transmitting the binary-framed pattern to each of the one or more other devices. Other type of encoding may be used.

In some embodiments, the logic block 104 and corresponding circuits are configured to operate at a scan rate faster than the IO frame—e.g., to minimize state output disturbances.

Referring still to FIG. 1, the logic block 104 is coupled to a first decoder 136 (shown as "Decoder with watchdog" 136) that receives serial data comprising the received state data (shown as "OTHER DEVICE SERIAL INPUT (#1)" 140) from link 110c and a second decoder 138 (shown as "Decoder with watchdog" 138) that receive serial data comprising the received state data (shown as "OTHER DEVICE SERIAL INPUT (#2)" 142) from link 110d. As shown herein, the decoder (e.g., 136, 138) includes a watchdog timer circuit that monitors the serial data for inactivity to determine whether the other controllable devices (e.g., 102b and/or 102c) are operational. The logic state circuit 118 receives an active state command by way of an active state signal (shown as "OWN DEVICE CHANNEL_ACTIVE (R)" 144) outputted from a controller 146 (shown as "Control System generating setpoints and modes of operation" 146) of the controllable device (e.g., 102a).

The controller 146 is configured to provide a mode of operation commands, e.g., to enable or disable the output of the controllable device (e.g., 102a, 102b, and 102c). In addition, in some embodiments, as shown in FIG. 1, the controller 146 is configured to provide a control-based setpoint 148 (e.g., associated with a sensor input to which the redundant control system provides redundant sensing; control output, e.g., to drive actuable control elements), the control-based setpoint 148 being scaled to generate the output current driven (e.g., 128, 130, 132) by the driver 124 (e.g., to provide a shared DAC (digital-to-analog converter) output or a shared electrical-current limit setting). As shown in FIG. 1, the logic circuit comprise a data multiplexer 122 configured to select one of a number of inputs 150 (shown as 150a, 150b, 150c, and 150d) in which the control-based setpoint has been scaled. As shown in FIG. 1, the controller 146 is configured to output a zero binary pattern, e.g., "0x0000". The inputs 150a, 150d to the data multiplexer 122, in some embodiments, is the control-based setpoint 148 and are selected for an inactive state (e.g., state value "00") and for a 100% output state (e.g., state value "11"). In some embodiments, the data multiplexer 122 is configured to select the control-based setpoint 148 as its input when either the inactive state or 100% output state is selected. To scale the control-based setpoint 148, for a 33% output state, the system 100 includes a multiplier 152 configured to multiply the control-based setpoint 148, which in this example is 16 bits, by hexadecimal value of "0x555". To scale the control-based setpoint 148, for a 50% output state, the system 100 includes a shifter 154 configured to shift the binary value of the control-based setpoint 148 by 1 bit. Other circuitry and logic may be used without departing from the spirit of the disclosure.

Figure 8:
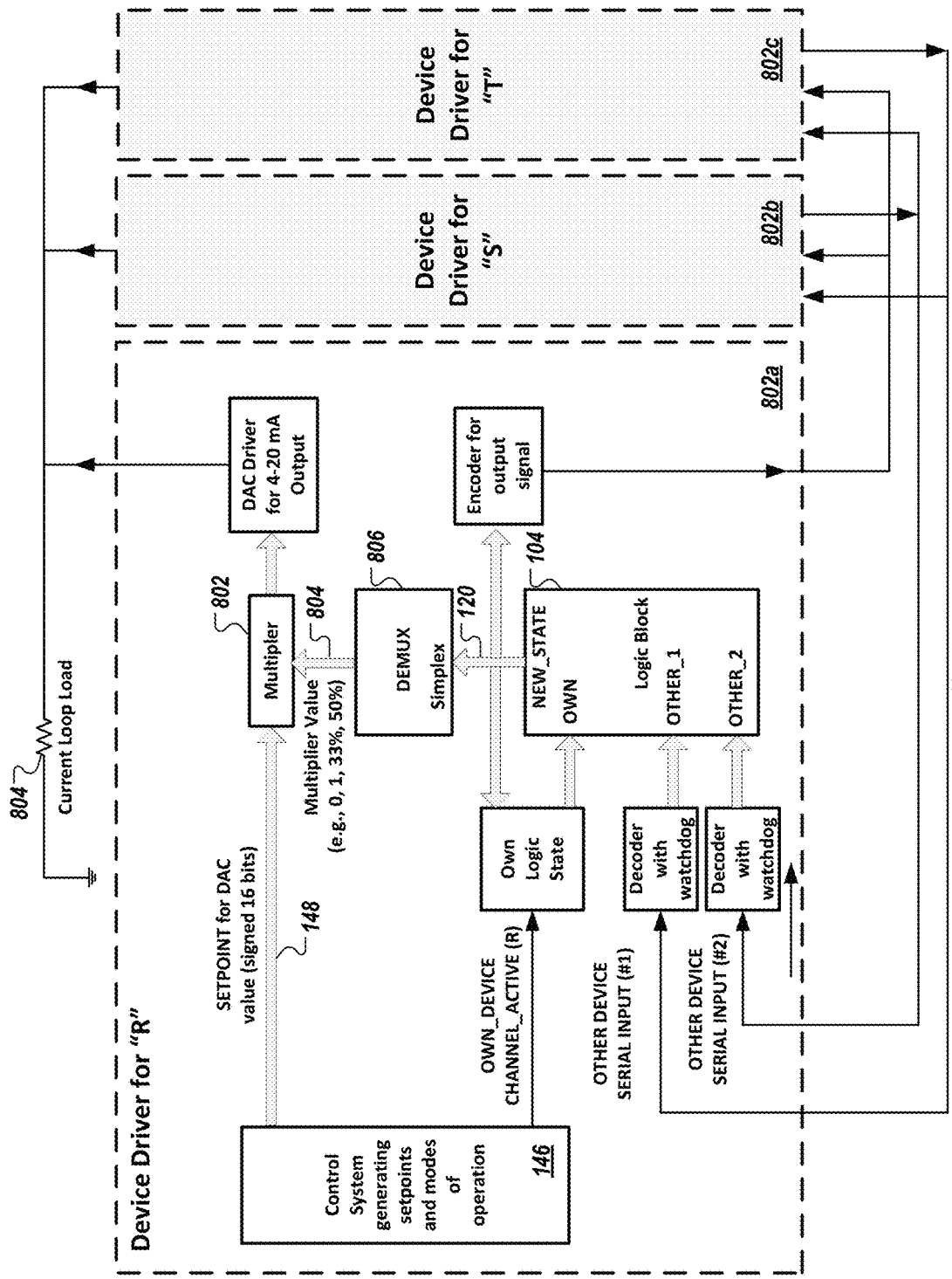
FIG. 8 illustrates example controllable devices, collectively, forming a redundant control system (e.g., dual or triple redundant control system), in accordance with another illustrative embodiment.

For example, in FIG. 8, the circuitry and logic may include a single multiplier 802 configured to receive the set point value 148 from the controller 146 and to multiply said input setpoint value 148 with a multiplier value 804 received from a demultiplexers circuit 806 (or logic block) to generate the scaled control-based setpoint to provide to the driver circuit (e.g., 214, 706). As shown in FIG. 8, the demultiplexers circuit 806 is configured to output a multiplier value 804 based on the output 120 of the logic block 104.

The logic for the decoding, watchdogs, logic block, multiplexing, and data multipliers may be implemented in FPGA logic, or the like, or as firmware operations in a processor, or the like.

Karnaugh Map of Operational State of the Controllable Devices

As stated above, FIGS. 2 and 3 are diagrams 200 showing example states 202 of the controllable device (e.g. 102a, 102b, and 102c) as stored in the logic block 104, in accordance with an illustrative embodiment. Specifically, FIG. 2 shows a Karnaugh map of the states 202 of the controllable device (e.g., 102a, 102b, and 102c) in which each state 202 is determined as a function of, at least, the internal state (shown as "Own state_msb" 204a and "Own state_lsb" 204b) of the controllable device (e.g., 102a) and the communicated states received from the other controllable devices (e.g., 102b and 102c), including a first communicated state (shown as "Other_1 msb" 206a and "Other_1 lsb" 206b) received from a first other controllable device (e.g., 102b) and a second communicated state (shown as "Other_2 msb" 208a and "Other_2 lsb" 208b) received from a second other controllable device (e.g., 102c). FIG. 3 shows operational description 302 associated with each of the states 202. As used herein, "msb" and "lsb" refers to most and least significant bit positions; also, a value of "1" corresponds an active bit, a value of "0" corresponds to an inactive bit, and a value of "x" corresponds to a "Don't Care".

Referring still to FIG. 2, each state 202 has a corresponding output 218 defined as a binary frame corresponding to one of the pre-defined states. As shown in FIG. 2, a binary frame 210 of binary value "00" corresponds to an inactive output; a binary frame 212 of binary value "01" corresponds to an output of 33%; a binary frame 214 of binary value "10" corresponds to an output of 50%; and a binary frame 216 of binary value "11" corresponds to an output of 100%. For example, for a 4-20 mA output, an output of 33% would be 4 mA/3 to 20 mA/3; an output of 50% would be 4 mA/2 to 20 mA/2; and an output of 100% would be 4-20 mA. In some embodiments, the output binary frame (e.g., 120a, 120b, 120c) corresponds to the output 218.

As shown in FIG. 2, each of the received state data (e.g., 206a, 206b, 208a, 208b) and the controllable device state data (e.g., 204a, 204b) includes two bits of data. Other number of data bits associated with the state data may be transmitted as the binary-framed pattern. The number of bits of each binary-framed pattern, associated with a given state data, is 2, 3, 4, 5, 6, 7, 8, or more. In some embodiments, output levels (e.g., 8, 12, 16, 24 bits, and etc.), rather than state data, of each device may be transmitted and used to orchestrate operations among the controllable devices 102.

In some embodiments, each state 202 also uses a separate active device bit 220 (shown as "Own Active" 220), which is used to determine the output 218. The active device bit 220, in some embodiments, corresponds to the active state signal 144 generated from the controller 146.

Figure 4:
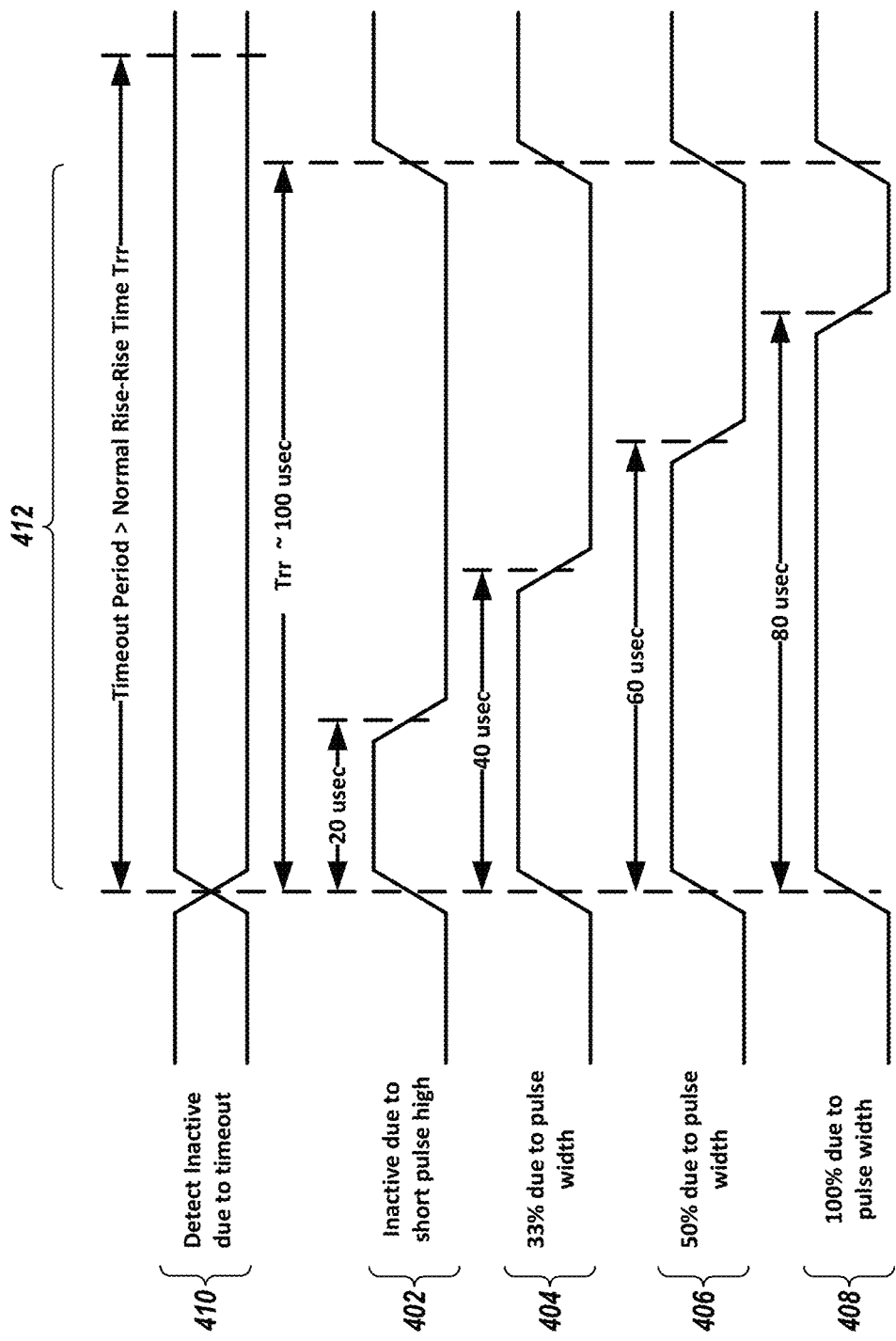
FIG. 4 is a diagram of example binary-framed patterns of various state data, of a controllable device, transmitted as a time-division multiplexed signal, in accordance with the illustrative embodiment.

FIG. 4 is a diagram of example binary-framed patterns (402, 404, 406, 408) of various state data, of a controllable device, transmitted as a time-division multiplexed signal, in accordance with the illustrative embodiment. As shown in FIG. 4, a first waveform 402 having a pulse duration of about 20% of the controllable cycle 412 (e.g., 20 us out of 100 us) is used to represent an inactive state output; a second waveform 404 having a pulse duration of about 40% of the controllable cycle 412 (e.g., 40 us out of 100 us) is used to represent a 33%-driven state output (e.g., when the system is in TMR operation); a third waveform 406 having a pulse duration of about 60% of the controllable cycle 412 (e.g., 60 us out of the 100 us) is used to represent a 50%-driven state output (e.g., when the system is in dual redundant operation); and a fourth waveform 408 having a pulse duration of about 80% of the controllable cycle 412 (e.g., 80 us out of the 100 us) is used to represent a 100%-drive state output (e.g., when the system is in simplex operation). Other control cycle period may be used.

Referring still to FIG. 4, a fault state may corresponds to a null waveform 410 (e.g., a high or low signal) that does not include a pulse (e.g., a positive or negative edge). To this end, presence of a pulse in one of the state waveforms provides an indication of a controllable device being alive and being responsive to orchestrated control operations over the links.

It is contemplated that different waveforms patterns and/or encoding scheme may be used to transmit state data among the controllable devices. The pulse duration can be selected for any state output and for any number of controllable devices that form the redundant control system. In addition, in some embodiments, it is contemplated that actual output values (rather than state data) are transmitted among the controllable devices. Though synchronous communication is preferred, asynchronous communication are nevertheless be used.

Method of Operation

FIG. 5 is a diagram of a method 500 of operating a plurality of controllable devices (e.g., 102a, 102b, 102c), collectively, forming the redundant control system 100, in accordance with an illustrative embodiment. As shown in FIG. 5, the method 500 includes, transmitting (502), at each controllable cycle (e.g., 412), over one or more links (e.g., 110a-110g), for a given controllable device (e.g., 102a, 102b, 102c) of the plurality of controllable devices, a binary-framed pattern (e.g., 134) of a set of pre-defined binary-framed patterns (e.g., a time-division pulse that corresponds to two or more bits or a bit pattern having two or more bits) to each of one or more other devices of the plurality of controllable devices, wherein each pre-defined binary-framed pattern (e.g., 134) corresponds to one of a pre-defined output state (e.g., 202) (e.g., state machine having states associated with a DAC output value for a DAC driver or current limit for solid state output driver), of a set of pre-defined output states (e.g., 100% for simplex operation 50% for dual redundant operation; and 33% for triple modular redundant operation, etc.), of the controllable device (e.g., 102a, 102b, 102c).

Referring still to FIG. 5, the method 500 includes, upon receiving, at the given controllable device, during a current controllable cycle, over the one or more links, a binary-framed pattern from each of the one or more other devices (e.g., two or more) of the plurality of controllable devices, generating (504), at an output (e.g., 128, 130, 132) of the given controllable device (e.g., 102a, 102b, 102c), for the current controllable cycle, an output value (e.g., DAC output value or current limit value) corresponding to one of the set of pre-defined output states based on logic states determined according to a first pre-defined output state (e.g., 204) associated with the transmitted binary-framed pattern and a second one or more pre-defined output states (e.g., 206, 208) associated with the received binary-framed pattern.

Because the approach is open-loop, during a cycle in which a controllable device is added or removed from the concerted operation, the outputted electrical currents may change from a desired total while the DAC(s) are being adjusted, resulting in an overcurrent event. Although unlikely, an overcurrent event of up to 300% may be experienced at the load (e.g., 106), for example, when two additional controllable devices simultaneously join the network controllable device and each initially contributes a 100% output. With the present architecture, this spike occurs for only one controllable cycle, which may be one scan of the logic circui. In the example shown in FIG. 4, the spike can be for about 100 us. To limit the excursion, in some embodiments, the system 100 includes a slew rate limiter, e.g., the DAC can be set to limit slew rate. While this limits the device from changing current immediately, it also limits other devices as they come on/off line from current disturbances. This gives a scan interval of time where another device can realize an erroneous situation exists (e.g., when three all come on line at the same instant not seeing the other two, deciding each is at 100% for a possible 300% overload) with a correction on the next scan (e.g. the three all see they are each at 100% and all adjust down to 33% for a net 100%). If the slew rate is limiting the swing of current to below 33% per scan, then there would not be an overcurrent.

FIGS. 6A, 6B, and 6C show the Karnaugh map of FIG. 2 organized according to different state output, in accordance with an illustrative embodiment.

As shown in FIG. 6A, the controllable device (e.g., 102a, 102b, 102c) is configured to output at 100% drive output when the device detects no other controllable devices or when the device sense an inactivity status message from each of the other controllable devices. In FIG. 6A, the serial data received from each of the other controllable device are "00" (i.e., "0" in the "Other_1 msb" and "Other_1 lsb"; and "0" in the "Other_2 msb" and "Other_2 lsb").

In FIG. 6B, the controllable device (e.g., 102a, 102b, and 102c) is configured to output at 50% drive output when the device detects one of the other controllable devices being faulted or when the device sense an inactivity status message from one other controllable devices. In FIG. 6B, the serial data received from each of the other controllable device are "00" (i.e., "0" in the "Other_1 msb" and "Other_1 lsb"; or "0" in the "Other_2 msb" and "Other_2 lsb").

In FIG. 6C, the controllable device (e.g., 102a, 102b, and 102c) is configured to output at 33% drive output when all three controllable device is contributing to the output of the system in some quantity. Because the output state is used for the next controllable cycle, the spikes or dips is experienced for only one cycle and is corrected in the next cycle.

Example Redundant Control System to Limit Current Limit for Solid State Relay

Figure 7:
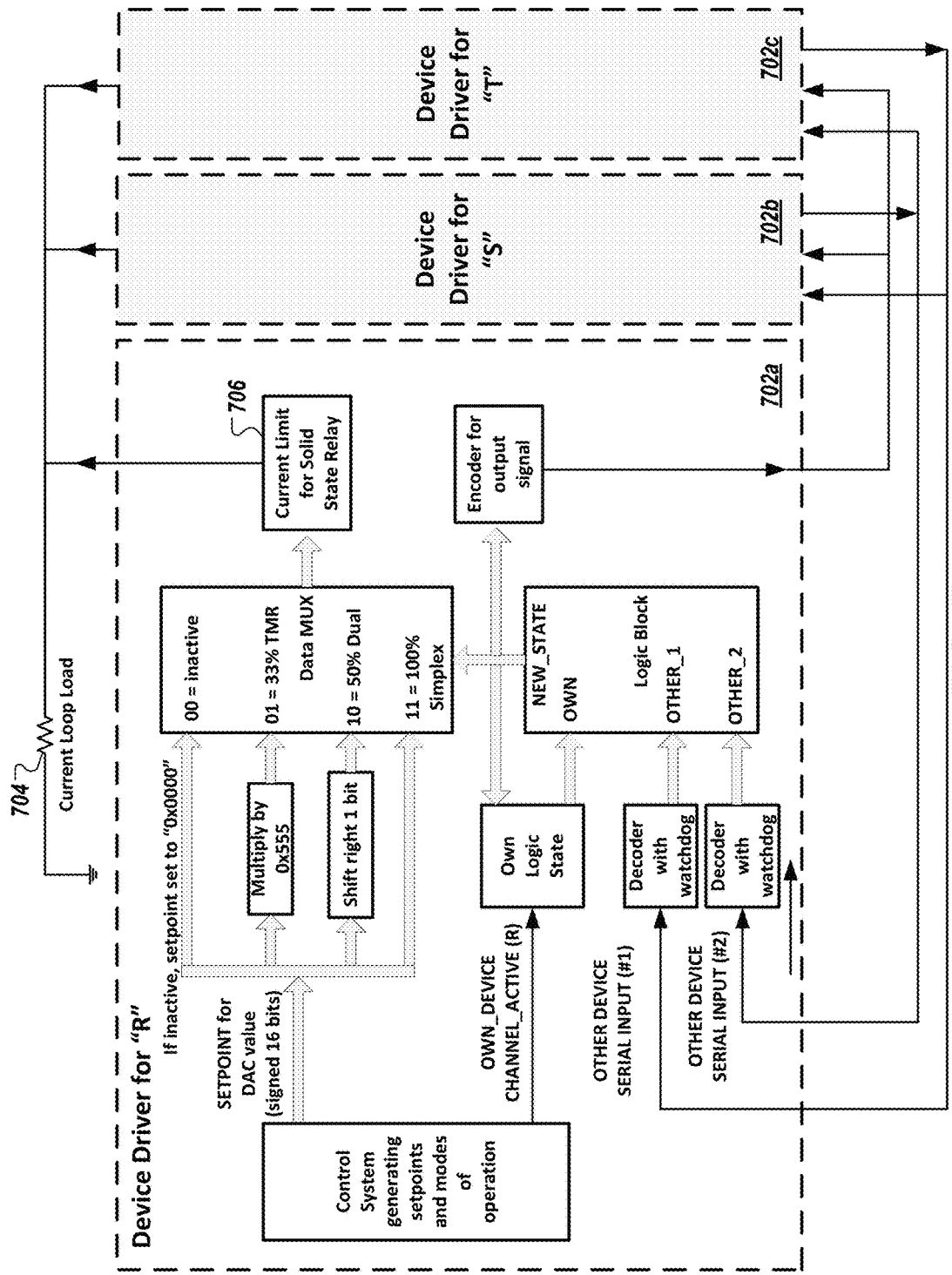
FIG. 7 illustrates example controllable devices, collectively, forming a redundant control system (e.g., dual or triple redundant control system) to control current limit of a solid state relay device, in accordance with an illustrative embodiment.

FIG. 7 illustrates example controllable devices (e.g., 702a, 702b, 702c), collectively, forming a redundant control system (e.g., dual or triple redundant control system) to control current limit of a solid state relay device 704, in accordance with an illustrative embodiment. Each controllable device includes similar components as described in relation to FIG. 1. The output of the device (e.g., 702a, 702b, 702c) includes a current limit driver 706 for a solid state relay (e.g., whose current limit setting is measured across a sensing load of the device 704).

A solid state relay device (e.g., 704), in some embodiments, is a component or a circuit board configured to switch an external voltage or current, e.g., in a protection circuit. The current limit driver may generate an electric current or voltage output that sets a current limit threshold for the switching operation of the solid state relay device.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of operating a plurality of controllable devices, collectively, forming a redundant control system, the method comprising:

transmitting, at each controllable cycle over one or more links for a given controllable device of the plurality of controllable devices, a binary-framed pattern of a set of pre-defined binary-framed patterns to each of one or more other controllable devices of the plurality of controllable devices, wherein each pre-defined binary-framed pattern corresponds to a present output state of a set of pre-defined output states of the controllable device, wherein each pre-defined output state of the set of pre-defined output states represents a discrete amount of electrical output transmitted by each of the plurality of controllable devices, wherein the discrete amount of electrical output is a percentage of total electrical output and is based on a number of active controllable devices in the plurality of controllable devices;

receiving, at the given controllable device during a current controllable cycle over the one or more links, a binary-framed pattern from each of the one or more other controllable devices of the plurality of controllable devices;

determining the present output state based on at least one received binary-framed pattern and the transmitted binary-framed pattern; and generating, at an output of the given controllable device for the current controllable cycle, the discrete amount of electrical output corresponding to the determined present output state.

2. The method of claim 1, further comprising:

updating the present output state for a next immediate controllable cycle based on logic states determined according to the present output state associated with the current controllable cycle and the at least one received binary-framed pattern associated with the current controllable cycle.

3. The method of claim 1, wherein logic states are used to determine the discrete amount of electrical output based on a number of active binary-framed pattern among the present output state and the at least one received binary-framed pattern.

4. The method of claim 1, wherein the given controllable device is communicatively coupled, via the one or more links, to each of the one or more other controllable devices, wherein the one or more links comprises a first time division multiplexed channel for transmitting the binary-framed pattern to each of the one or more other controllable devices and a second time division multiplexed channel for receiving the binary-framed pattern from each of the one or more other controlled devices.

5. The method of claim 1, wherein the set of pre-defined output states comprises four output states including a first output state associated with zero electrical output, a second output states associated with 33-percent shared electrical output, a third output state associated with 50-percent shared electrical output, and a fourth output state associated with no shared electrical output.

6. The method of claim 1, wherein the discrete amount of electrical output is generated by scaling a control setpoint for the discrete amount of electrical output with a pre-defined scale value associated with a logic state determined according to the present output state and the at least one received binary-framed pattern.

7. The method of claim 1, wherein the given controllable device comprises an output circuit selected from the group consisting of a DAC (digital-to-analog converter) driver configured for 4-20mA output, a DAC driver configured for 0-200mA, and a solid state driver with current limit.

8. The method of claim 1 further comprising updating the present output state based on a first number of received binary-framed patterns in a first cycle and a second number of received binary-framed patterns in a second cycle.

9. An apparatus that collectively forms a redundant control system with one or more other apparatuses, the apparatus comprising:

a logic-based circuit configured to:

transmit, at each controllable cycle a binary-framed pattern of a set of pre-defined binary-framed patterns to each of the one or more other apparatuses, wherein each pre-defined binary-framed pattern corresponds to a present output state of a set of pre-defined output states of the apparatus, wherein each pre-defined output state of the set of pre-defined output states represents a discrete amount of electrical output transmitted by each of the apparatus and the one or more other apparatuses, wherein the discrete amount of electrical output is a percentage of total electrical output and is based on a number of active apparatus;

receive, during a current controllable cycle over one or more links, a binary-framed pattern from each of one or more other apparatuses;

determine the present output state based on at least one received binary-framed pattern and the transmitted binary-framed pattern; and generate, at an output for the current controllable cycle, the discrete amount of electrical output corresponding to the determined present output state.

10. The apparatus of claim 9, wherein the logic-base circuit is further configured to update the present output state for a next immediate controllable cycle based on logic states determined according to the present output state associated with the current controllable cycle and the at least one received binary-framed pattern associated with the current controllable cycle.

11. The apparatus of claim 9, wherein the logic-based circuit is configured to determine the discrete amount of electrical output based on a number of active binary-framed pattern among the present output state and the at least one received binary-framed pattern.

12. The apparatus of claim 9, wherein the apparatus is communicatively coupled, via the one or more links, to each of the one or more other apparatuses, wherein the one or more links comprises a first time division multiplexed channel for transmitting the binary-framed pattern to each of the one or more other apparatuses and a second time division multiplexed channel for receiving the binary-framed pattern from each of the one or more other apparatuses.

13. The apparatus of claim 9, wherein the set of pre-defined output states comprises four output states, including a first output state associated with zero electrical output, a second output states associated with 33-percent shared electrical output, a third output state associated with 50-percent shared electrical output, and a fourth output state associated with no shared electrical output.

14. The apparatus of claim 9, comprising:

a multiplexer circuit to select one of multiple scaled control setpoint provided as input thereto, the multiplexer circuit being configured to select the discrete amount of electrical output based on a logic state value determined according to the present output state and the at least one received binary-framed pattern.

15. The apparatus of claim 9, comprising an output circuit selected from the group consisting of a DAC driver configured for 4-20mA output, a DAC driver configured fir 0-200mA, and a solid state driver with current limit.

16. The apparatus of claim 9, wherein the logic-based circuit is selected from the group consisting of a 6-bit decoder, a 9-bit decoder, and a 16-bit decoder.

17. The apparatus of claim 9, wherein the logic-based circuit is further configured to update the present output state based on a first number of received binary-framed patterns in a first cycle and a second number of received binary-framed patterns in a second cycle.

18. A controllable device that collectively forms a redundant control system with one or more other controllable devices, the controllable device comprising:

an electrical output driver;

an output signal driver;

a logic-based circuit configured to:
- determine a present output state for the controllable device;
- transmit, via said electrical output driver, a discrete amount of electrical output, wherein the discrete amount of electrical output is based on a present output state;
- transmit, via said output signal driver, one or more signals to the one or more other controllable devices, wherein the one or more signals indicate the present output state;
- receive one or more signals from the one or more other controllable devices;
- determine a number of connected controllable devices based on the one or more signals; and
- determine an updated present output state for the controllable device based on the number of connected controllable devices and the present output state.

19. The controllable device of claim 18, wherein the discrete amount of electrical output is a percentage based on the number of connected controllable devices.

20. The controllable device of claim 18, wherein the logic-based circuit is further configured to store a plurality of output states, wherein each output state of the plurality of output states defines a corresponding discrete amount of electrical output, and wherein the plurality of output states includes the present output state and the updated present output state.

\* \* \* \* \*

UNITED STATES PATENT AND TRADEMARK OFFICE
CERTIFICATE OF CORRECTION

PATENT NO. : 10,338,548 B2
APPLICATION NO. : 15/489107
DATED : July 2, 2019
INVENTOR(S) : Daniel Milton Alley Page 1 of 1

It is certified that error appears in the above-identified patent and that said Letters Patent is hereby corrected as shown below:

In the Claims

In Claim 9, Column 14, Line 6, delete "output and is based on a number of active apparatus;" and insert therefor -- output and is based on a number of active apparatuses; --.

In Claim 10, Column 14, Line 14, delete "The apparatus of claim 9, wherein the logic-base" and insert therefor -- The apparatus of claim 9, wherein the logic-based --.

In Claim 15, Column 14, Line 51, delete "a DAC driver configured fir" and insert therefor -- a DAC driver configured for --.

Signed and Sealed this
Twelfth Day of November, 2019

Andrei Iancu
*Director of the United States Patent and Trademark Office*